US008906242B2

(12) United States Patent
McGuire et al.

(10) Patent No.: US 8,906,242 B2
(45) Date of Patent: Dec. 9, 2014

(54) TRANSPORTABLE REACTOR TANK

(75) Inventors: Dennis McGuire, Stuart, FL (US);
Sanjeev Jakhete, Stuart, FL (US)

(73) Assignee: Ecosphere Technologies, Inc., Stuart, FL (US)

( * ) Notice: Subject to any disclaimer, the term of this patent is extended or adjusted under 35 U.S.C. 154(b) by 983 days.

(21) Appl. No.: 13/019,113

(22) Filed: Feb. 1, 2011

(65) Prior Publication Data
US 2011/0186526 A1   Aug. 4, 2011

Related U.S. Application Data

(63) Continuation-in-part of application No. 12/765,971, filed on Apr. 23, 2010, now Pat. No. 8,721,898, which is a continuation-in-part of application No. 12/399,481, filed on Mar. 6, 2009, now Pat. No. 7,699,988, which is a continuation-in-part of application No. 12/184,716, filed on Aug. 1, 2008, now Pat. No. 7,699,994.

(60) Provisional application No. 60/953,584, filed on Aug. 2, 2007.

(51) Int. Cl.
*C02F 1/78* (2006.01)

(52) U.S. Cl.
CPC ........................................ *C02F 1/78* (2013.01)
USPC ................. 210/748.01; 210/748.02; 210/243; 210/660; 210/205; 210/177; 166/90.1; 166/267; 422/20; 422/22; 422/127; 422/128; 422/186; 204/660

(58) Field of Classification Search
CPC ................ C02F 1/68; C02F 1/78; C02F 9/04; C02F 1/44
USPC ........... 210/748.01, 638, 660, 205, 177, 190, 210/721, 665, 702, 748.02, 243, 153; 166/90.1, 267; 422/20, 22, 127, 128, 422/186; 204/660
See application file for complete search history.

(56) References Cited

U.S. PATENT DOCUMENTS 3,523,891 A   8/1970   Mehl
3,664,951 A   5/1972   Armstrong
(Continued)

OTHER PUBLICATIONS

W. Kerfoot, "Gas and oil recovery in shale deposits", U.S. Appl. No. 60/908,453, filed Mar. 28, 2007.
(Continued)

*Primary Examiner* — Walter D Griffin
*Assistant Examiner* — Cameron J Allen
(74) *Attorney, Agent, or Firm* — McHale & Slavin, P.A.

(57) ABSTRACT

Disclosed is an improved water treatment apparatus. The treatment apparatus is pressurized and operates on a continuous flow of fluids which are subjected to hydrodynamic waves, acoustic ultrasonic waves in combination with injected ozone. The treatment tank includes a tangential inlet that induces a rotating flow into the tank thereby increasing the mixing of the ozone within the effluent. The ozonated fluid is further electro chemically treated with DC current. The treatment tank provides a cost efficient and environmentally friendly process and apparatus for cleaning and recycling fluids as contaminated as frac water, used to stimulate gas production from shale formations, as well as other types of fluids having various levels of contaminants such as aerobic and anaerobic bacteria and suspended solids. The calcium carbonate scaling tendency is reduced to an acceptable level without the use of acids, ion exchange materials, or anti scaling chemicals which is of economical and environmental significance and benefit. The treatment apparatus is modular in construction and compact in overall configuration. The modular design makes the treatment apparatus easy to install, maintain, repair, replace and transport. The treatment apparatus and associated equipment is sized and configured to be mounted within a truck trailer body.

19 Claims, 9 Drawing Sheets

(56) References Cited

U.S. PATENT DOCUMENTS

| | | | |
|---|---|---|---|
| 3,706,646 | A | 12/1972 | Gibson, Jr. et al. |
| 3,989,608 | A | 11/1976 | DeMonbrun et al. |
| 4,003,832 | A | 1/1977 | Henderson et al. |
| 4,076,617 | A | 2/1978 | Bybel et al. |
| 4,957,606 | A | 9/1990 | Juvan |
| 5,679,257 | A | 10/1997 | Coate et al. |
| 5,868,945 | A | 2/1999 | Morrow et al. |
| 5,897,765 | A | 4/1999 | Mercier |
| 6,182,453 | B1 | 2/2001 | Forsberg |
| 6,221,260 | B1 | 4/2001 | Chahine et al. |
| 6,555,011 | B1 | 4/2003 | Tribelsky et al. |
| 6,818,128 | B2 | 11/2004 | Minter |
| 6,902,678 | B2 | 6/2005 | Tipton |
| 6,911,153 | B2 | 6/2005 | Miner |
| 7,093,661 | B2 | 8/2006 | Olsen |
| 7,131,638 | B2 | 11/2006 | Kerfoot |
| 7,156,984 | B2 | 1/2007 | Kerfoot |
| 7,247,244 | B2 | 7/2007 | Kozyuk |
| 7,326,002 | B2 | 2/2008 | Kerfoot |
| 7,384,563 | B2 | 6/2008 | Harmless et al. |
| 7,481,937 | B2 | 1/2009 | Rice et al. |
| 7,595,003 | B2 | 9/2009 | Maddox |
| 7,699,988 | B2 | 4/2010 | McGuire et al. |
| 7,699,994 | B2 | 4/2010 | McGuire et al. |
| 2007/0160493 | A1 | 7/2007 | Ronholdt et al. |
| 2008/0061006 | A1 | 3/2008 | Kerfoot |
| 2008/0237141 | A1 | 10/2008 | Kerfoot |
| 2008/0272065 | A1 * | 11/2008 | Johnson ................ 210/770 |
| 2010/0320147 | A1 | 12/2010 | McGuire et al. |

OTHER PUBLICATIONS

Allegheny Ozone, "Treating frac water with ozone", Allegheny Ozone, Inc. (Dec. 11, 2009).

Y. Cong et al, "Hydroxyl radical electrochemically generated with water as the complete atom source and its environmental application", Chinese Science Bulletin, 52(10):1432-1435 (May 2007).

K. Klasson et al, "Ozone treatment of soluble organics in produced water (FEAC307)", Milestone Report: Letter Report with the Summarized Results from Continuous-flow Testing, pp. 1-18, Oak Ridge National Laboratory, Oak Ridge, Tennessee (Dec. 2000).

K. Klasson et al, "Ozone treatment of soluble organics in produced water", Petroleum Environmental Research Forum Project 98-04, pp. 1-85, Oak Ridge National Laboratory, Oak Ridge, Tennessee (Jan. 2002).

T. Klasson, "Treatment of water-soluble organics in produced water", pp. 1-2 (Dec. 11, 2009).

* cited by examiner

FIG. 9

TRANSPORTABLE REACTOR TANK

CROSS-REFERENCE TO RELATED APPLICATIONS

This application is a continuation-in-part of U. S. patent application Ser. No. 12/765,971, entitled "Improved Reactor Tank", filed Apr. 23, 2010, now U.S. Pat. No. 8,721,898 which is a continuation-in-part of U.S. patent application Ser. No. 12/399,481, entitled "Enhanced Water Treatment for Reclamation of Waste Fluids and Increased Efficiency Treatment of Potable Waters", filed Mar. 6, 2009, now U.S. Pat. No. 7,699,988, issued Apr. 20, 2010, which is a continuation-in-part of U.S. patent application Ser. No. 12/184,716, entitled "Enhanced Water Treatment for Reclamation of Waste Fluids and Increased Efficiency Treatment of Potable Waters", filed Aug. 1, 2008, now U.S. Pat. No. 7,699,994, issued Apr. 20, 2010, which in turn is a continuation-in-part of U.S. Provisional Patent Application No. 60/953,584, entitled "Enhanced Water Treatment for Reclamation of Waste Fluids and Increased Efficiency Treatment of Potable Water", filed Aug. 02, 2007, the contents of which are hereby expressly incorporated by reference.

FIELD OF THE INVENTION

This invention related to the field of fluid treatment and, in particular, to an improved treatment apparatus for effectively destroying aerobic and anaerobic bacteria and reducing both suspended and dissolved solids to address various water treatments.

BACKGROUND OF THE INVENTION

The Applicant has worked extensively with some of the foulest waters imaginable. In many such instances the treatment of such fluids can be extremely expensive. For example, the global direct costs to oil companies for treating water used in oil and gas recovery surpassed $20 billion in 2007, with expenses skyrocketing in the following years.

While the instant invention can be used on most any water that is contaminated, it is especially suited for water contaminated with aerobic or anaerobic bacteria, or waters that require the reduction in dissolved or suspended solids. Aerobic bacteria, often called a slime forming bacteria, produces a polysaccharide bio film that often adheres to the shale and inhibits the flow of gasses. Anaerobic bacteria can be include an acid producing bacteria such as APB that grows on metal and secretes acid producing corrosion, or SRB which is a sulfate reducing bacteria that produces hydrogen sulfide and has the potential to create a dangerous situation and literally shut down a well.

The produced water example will highlight a major problem with contaminated water, produced waters are the byproduct associated with oil and gas production and contain both natural and manmade contaminants. The US Department of Energy (DOE) has called produced water "by far the largest single volume byproduct or waste stream associated with oil and gas production." The DOE further terms its treatment a serious environmental concern and a significantly growing expense to oil and gas producers. While the instant cavitation reactor has a beneficial use with most any water treatment problem, the produced water problem highlights the effectiveness of the system.

In 2007, the world's oil and gas fields produced 80 billion barrels of water needing processing. The average is now almost nine barrels of produced water for each barrel of oil extracted. And the ratio of water to hydrocarbons increases over time as wells become older. That means less oil or gas and more contaminated water as we attempt to meet rising global energy needs.

The discharge of produced water is unacceptable unless treated. Currently it is necessary to introduce chemical polymers to flocculate the slurry and further treat the volatile organic compounds (VOC's) which are emitted as gases from certain solids or liquids. The VOC's are known to include a variety of chemicals some of which may have short or long term adverse health effects and is considered an unacceptable environmental discharge contaminant. Unfortunately, the use of polymers and a settling time is so expensive that economically it becomes more conducive to treat the waste off-site which further adds to the cost of production by requiring off-site transport/treatment or shipped to a hazardous waste facility where no treatment is performed.

The applicants have developed an Enhanced Water Treatment for Reclamation of Waste Fluids and Increased Efficiency Treatment of Potable Water which employed the use of a cavitation reactor. The instant invention advances the developed processes of removing heavy metals, oil sheens, cations and organics at a well site but further provides a device capable of treating numerous other water related problems providing both an economic and environmental benefit.

In addition there are many gas fields, most notably in North America, that contain enormous amounts of natural gas. This gas is trapped in shale formations that require stimulating the well using a process known as fracturing or fracing. The fracing process uses large amounts of water and large amounts of particulate fracing material (frac sands) to enable extraction of the gas from the shale formations. After the well site has been stimulated the water pumped into the well during the fracing process is removed. The water removed from the well is referred to as flowback fluid or frac water. A typical fracing process uses from one to four million gallons of water to fracture the formations of a single well. Water is an important natural resource that needs to be conserved wherever possible. One way to conserve water is to clean and recycle this flowback or frac water. The recycling of frac water has the added benefit of reducing waste product, namely the flowback fluid, which will need to be properly disposed. On site processing equipment, at the well, is the most cost effective and environmentally friendly way of recycling this natural resource.

It takes approximately 4.5 million gallons of fresh water to fracture a horizontal well. This water may be available from local streams and ponds, or purchased from a municipal water utility. This water must be trucked to the well site by tanker trucks, which carry roughly five thousand gallons per trip. During flowback operations, approximately 300 tanker trucks are used to carry away more than one million gallons of flowback water per well for offsite disposal. For a 3 well frac site these numbers will increase by a factor of three.

The present invention provides a cost-effective onsite cavitation reactor that combines ozone, hydrodynamic cavitation, ultrasound and electro-precipitation for enhanced water treatment. The treatment apparatus is sized and configured to optimize the amount of water to be processed. It is also configured to be compact in overall size to facilitate its use a remote well sites. The treatment device is also readily transportable such that it can be moved from well site to well site.

SUMMARY OF THE INVENTION

The instant invention is directed to an improved treatment apparatus that introduces high intensity acoustic energy and ozone into a conditioning container to provide a mechanical separation of materials by addressing the non-covalent forces of particles or van der Waals force. The invention further discloses hydrodynamic cavitation of the ozone and effluent prior to entry into the treatment apparatus to improve to improve the mixture of effluent with ozone. The ultrasound transducers used to provide the acoustic energy strategically located within the treatment apparatus to accelerate mass transfer as well as electrodes to break down contaminants at a faster rate.

Thus an objective of the invention is to provide a high capacity compact and improved cavitation reactor to treat fluids, the fluids are subjected to ozone saturation and flash mixed with hydrodynamic cavitation and dual frequency ultrasonic transducers to initiate flotation of oils and suspended solids and the conversion of ozone to hydroxyl radicals.

Yet still another objective of the invention is to disclose the use of a cavitation reactor that can be used in treatment of most any type of fluid by providing an effective means to destroy aerobic and anaerobic bacteria, and provide a reduction in contaminants.

Still another objective of the invention is to provide an improved cavitation reactor that eliminates the need for biocide and anti-scalant chemical typically employed in frac waters.

Still another objective of the invention is to provide a process to reduce scaling tendencies without the aid of acid, ion exchange processes, or anti scaling chemicals.

Yet another objective of the invention is to a process for lowering scaling tendencies in frac, flowback water, by reducing the Langelier Saturation Index to below zero.

Another objective of the invention is employ nano-cavitation imploding bubbles to provide the liquid gas interface that is instantaneously heated to approximately 900 degrees Fahrenheit which oxides all organic compounds through sonoluminescence.

Still another objective of the invention is to provide an improved cavitation reactor for an on-site process that will lower the cost of oil products by reducing the current and expensive processes used for off-site treatment of waste fluids.

Another objective of the invention is to provide an improved cavitation reactor for on-site process that will extend the life of fields and increase the extraction rate per well.

Still another objective of the instant invention is to teach the combination of ultrasonic and hydrodynamic agitation in conjunction with ozone introduction into a closed pressurized generally cylindrically shaped container whereby the cavitations cause disruption of the materials allowing the ozone to fully interact with the contaminated flow back water for enhancement of separation purposes. In addition, anodes in the outlet line provide DC current to the flowback water to drive the electro precipitation reaction for the hardness ions present with the flowback water.

Still another objective is to teach a process of enhanced ozone injection wherein ozone levels can be made more effective.

Another objective of the invention is to provide a cost effective and environmentally friendly process and apparatus for cleaning and recycling frac water at the well site using transportable equipment.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
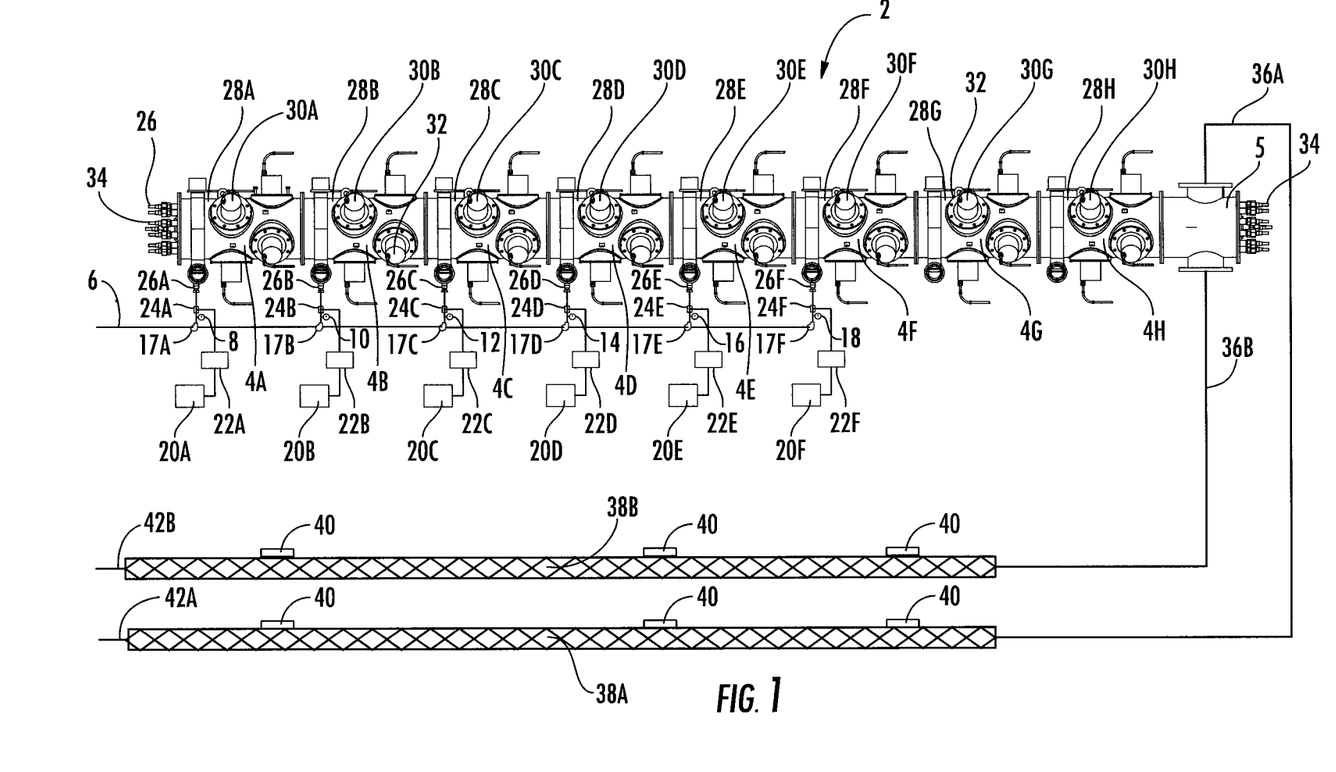
FIG. 1 is a schematic flow diagram for the treatment apparatus.

Now referring to the Figures in general, FIG. 1 illustrates the improved cavitation reactor treatment apparatus 2 of the instant invention. The treatment apparatus includes cylindrical segments connected together in series 4A, 4B, 4C, 4D, 4E, 4F, 4G, and 4H. One end of segment 4A includes a cover plate while the opposite end of segment 4A is connected to segment 4B. The opposite end of segment 4B is connected to segment 4C, as is 4c to 4D, and 4D to 4E, and 4e to 4F, and 4F to 4G and 4G to 4H. The opposite end of segment 4H is connected to an outlet segment 5 having a single inlet connected to segment 4H and two outlets that are oriented at a right angle to the inlet and positioned diametrically opposite to one another. A pair of main raw water fluid inlet conduits 6 is fluidly connected to a source of raw water to be treated. Each one of the conduits 6 feeds one side of the treatment apparatus 2. For purposes of clarity and simplicity a detailed description will be provided for one side of the treatment apparatus, it being understood that the flow paths from conduits 6 and into segments 4A through 4F on the opposite side are the mirror image of the side described as follows.

Figure 4:
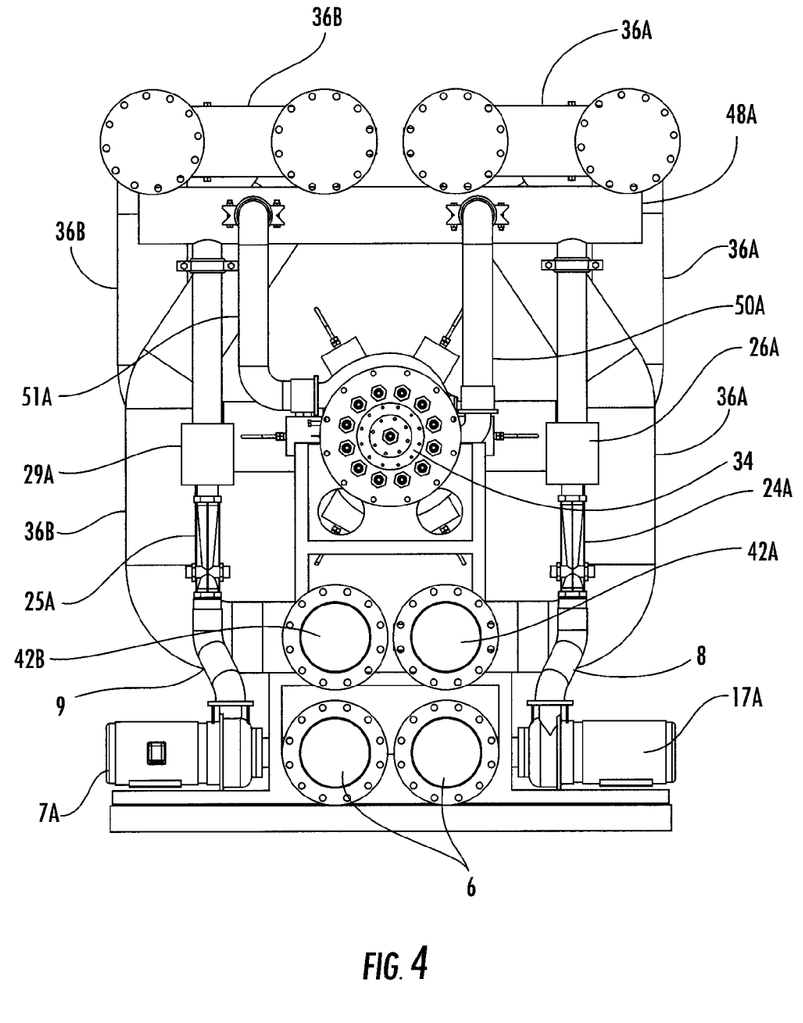
FIG. 4 is an end view of the treatment apparatus.

With regards to cylindrical segment 4A a pump 17A directs fluid from inlet conduit 6 to inlet line 8. The inlet line 8 is fluidly connected to an ozone injector 24A. An oxygen generator 20A feeds oxygen into an ozone generator 22A which in turn feeds ozone into the ozone injector 24A where the ozone is injected into the water to be treated. The water leaving the ozone injector 24A is then directed into two flash reactors arranged in series 26A. From the flash reactors 26A the water and ozone mixture in then passed through hydrodynamic mixing manifold 48A, and into a tangential inlet passageway 50A for segment 4A, as shown in FIG. 4.

With regards to cylindrical segment 4B a pump 17B directs fluid from the inlet conduit 6 to the inlet line 10. The inlet line 10 is fluidly connected to an ozone injector 24B. Oxygen generator 20B feeds oxygen into an ozone generator 22B which in turn feeds ozone into the ozone injector 24B where the ozone is injected into the water to be treated. The water leaving the ozone injector 24B is then directed into two flash reactors arranged in series 26B. From the flash reactors 26B the water and ozone mixture is then passed through a hydrodynamic mixing manifold 48B, and into a tangential inlet passageway 50B for segment 4B.

As regards cylindrical segment 4C a pump 17C directs fluid from the inlet conduit 6 to the inlet line 12. The inlet line 12 is fluidly connected to an ozone injector 24C. Oxygen generator 20C feeds oxygen into an ozone generator 22C which in turn feeds ozone into the ozone injector 24C where the ozone is injected into the water to be treated. The water leaving the ozone injector 24C is then directed into a flash reactor 26C. From the flash reactor 26C the water and ozone mixture is then passed through a hydrodynamic mixing manifold 48C, and into a tangential inlet passageway 50C for segment 4C.

With respect to cylindrical segment 4D a pump 17D directs fluid from the inlet conduit 6 to the inlet line 14. The inlet line 14 is fluidly connected to an ozone injector 24D. Oxygen generator 20D feeds oxygen into an ozone generator 22D which in turn feeds ozone into the ozone injector 24D where the ozone is injected into the water to be treated. The water leaving the ozone injector 24D is then directed into two flash reactors arranged in series 26D. From the flash reactor 26D the water and ozone mixture is then passed through a hydrodynamic mixing manifold 48D, and into a tangential inlet passageway 50D for segment 4D.

Similarly with respect to cylindrical segment 4E a pump 17E directs fluid from the inlet conduit 6 to the inlet line 16. The inlet line 16 is fluidly connected to an ozone injector 24E. Oxygen generator 20E feeds oxygen into an ozone generator 22E which in turn feeds ozone into the ozone injector 24E where the ozone is injected into the water to be treated. The water leaving the ozone injector 24E is then directed into two flash reactors arranged in series 26E. From the flash reactor 26E the water and ozone mixture is then passed through a hydrodynamic mixing manifold 48E, and into a tangential inlet passageway 50E for segment 4E.

Similarly with respect to cylindrical segment 4F a pump 17F directs fluid from the inlet conduit 6 to the inlet line 18. The inlet line 18 is fluidly connected to an ozone injector 24F. Oxygen generator 20F feeds oxygen into an ozone generator 22F which in turn feeds ozone into the ozone injector 24F where the ozone is injected into the water to be treated. The water leaving the ozone injector 24F is then directed into two flash reactors arranged in series 26F. From the flash reactor 26F the water and ozone mixture is then passed through a hydrodynamic mixing manifold 48F, and into a tangential inlet passageway 50F for segment 4F.

Each ozone injector 24A-24F is a high efficiency, venturi type, differential pressure injector which mixes the ozone gas with the water. The water enters the injector at a first inlet and the passageway within the injector tapers in diameter and becomes constricted at an injection zone located adjacent the second inlet. At this point the flow changes into a higher velocity jet stream. The increase in velocity through the injection zone results in a decrease in pressure thereby enabling the ozone to be drawn in through the second inlet and entrained into the water. The flow path down stream of the injection zone is tapered outwards towards the injector outlet thereby reducing the velocity of the water. Within each injector, ozone is injected through a venturi at vacuum of approximately 5 inches of Hg. The pressure drop across the venturi is approximately 60 psi which ensures good mixing of the ozone gas with the fluid and small ozone bubble generation. Each pump 17A-17F feeds water and ozone into injectors 24A through 24F, respectively.

The hydrodynamic cavitation mixing chambers 48A through 48F are constructed as cylindrical flow through chambers each having a series of baffles confronting the direction of hydrodynamic flow to produce varied cavitation effects. The mixing baffles are arranged so that when the fluid is discharged from one baffle, it discharges with a swirling action and then strikes the downstream baffle. The baffles provide a local contraction of the flow as the fluid flow confronts the baffle element thus increasing the fluid flow pressure. As the fluid flow passes the baffle, the fluid flow enters a zone of decreased pressure downstream of the baffle element thereby creating a hydrodynamic cavitation field. Hydrodynamic cavitation typically takes place by the flow of a liquid under controlled conditions through various geometries. The phenomenon consists in the formation of hollow spaces which are filled with a vapor gas mixture in the interior of a fast flowing liquid or at peripheral regions of a fixed body which is difficult for the fluid to flow around and the result is a local pressure drop caused by the liquid movement. At a particular velocity the pressure may fall below the vapor pressure of the liquid being pumped, thus causing partial vaporization of the cavitating fluid. With the reduction of pressure there is liberation of the gases which are dissolved in the cavitating liquid. These gas bubbles also oscillate and then give rise to the pressure and temperature pulses. The mixing action is based on a large number of forces originating from the collapsing or implosions of cavitation bubbles. If during the process of movement of the fluid the pressure at some point decreases to a magnitude under which the fluid reaches a boiling point for this pressure, then a great number of vapor filled cavities and bubbles are formed. Insofar as the vapor filled bubbles and cavities move together with the fluid flow, these bubbles and cavities may move into an elevated pressure zone. Where these bubbles and cavities enter a zone having increased pressure, vapor condensation takes place within the cavities and bubbles, almost instantaneously, causing the cavities and bubbles to collapse, creating very large pressure impulses. The magnitude of the pressure impulses with the collapsing cavities and bubbles may reach ultra high pressure implosions leading to the formation of shock waves that emanate form the point of each collapsed bubble.

Segments 4G and 4H each include four ultrasonic transducer assemblies 32. Each transducer includes an electrically heated plate that is powered by power lines 30G and 30H, each respectively. The cylindrical walls of segments 4G and 4H are negatively charged by electrical lines 30G and 30 H, each respectively.

In total, the treatment apparatus 2 includes twelve pumps, twelve oxygen generators, twelve ozone generators, twelve ozone injector nozzles and twelve flash reactors. The total treatment apparatus is capable of mixing 2880 gr/hr of ozone into a 5000 gpm of flow rate of water. In addition the treatment apparatus includes 48 dual frequency ultrasonic transducer assemblies to carry out the acoustic cavitation.

Figure 2:
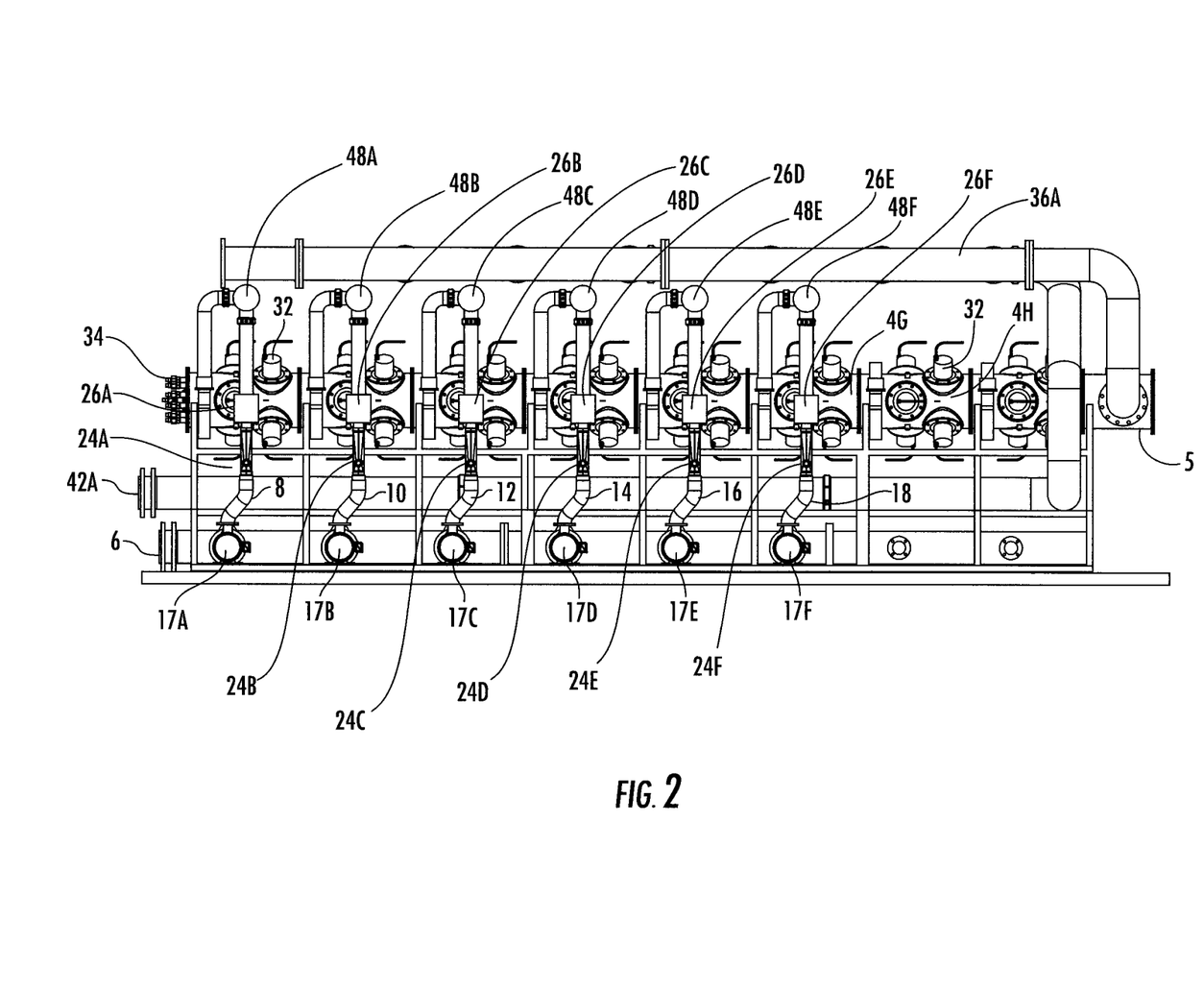
FIG. 2 is a right side view of the treatment apparatus.

As can be seen in FIGS. 1 and 2 a plurality of electrodes 34 extend from the closed end of segment 4A and pass through segments 4A through 4H as well as segment 5. As can best be seen in FIG. 1 the cover plates in segment 4A and 5 provide support for the plurality of electrodes 34 that extend throughout the length of the treatment apparatus 2. Electrodes 34 are preferably platinum coated and electrically charged to precipitate hardness salt on the inner surfaces of the cylindrical treatment segments. The electrodes 34 receive a positive DC charge via electrical line 27. The electrodes 34 are designed to release DC power into the effluent. The electrodes 34 are positively charged and therefore serve as anodes within the tank. At the same time the walls of the cylindrical treatment segments are negatively charged via line 28A, 28B, 28C, 28D, 28E, 28F, 28G and 28H all of which are electrically connected to a negative source of DC power and therefore serve as cathodes. The anode electrodes 34 help to generate hydroxyl radicals from the oxygen molecules thereby facilitating the breakdown of contaminant in the water at a faster rate. The preferred number of rods, as shown, is twelve but more or less could be used as well. The anodes 34 are powered by a DC power supply whose power output can be up to 100 volts DC and up to 1000 amps current. The DC power supply can be varied according to targeted effluent. For example, for water effluent with a higher salt content the power supply output would provide less DC voltage and more DC current than water with low levels of salt. In one preferred embodiment the electrodes are configured to release 160 KW DC power into the water. The cylindrical treatment cavity formed by segments 4A through 4H and 5 is maintained at an internal pressure greater than atmospheric.

As best seen in FIGS. 1, 2 and 4 each of the cylindrical segments 4A through 4H of the treatment apparatus 2 includes six ultrasonic transducer assemblies 32. Each transducer assembly is rated at approximately 500 watts. The transducers 32 are arranged in two rows each rows, each row having three transducer assemblies that are spaced approximately 120 degrees apart from one another around the circumference of the segment. The output of each transducer is directed towards a longitudinal centerline of the cylindrical segment. Each cylindrical segment, 4A through 4H, includes three 16 KHz and three 20 KHz frequency ultrasonic transducers that are arranged in opposing relationship. Each transducer includes a diaphragm that is balanced with the help of a pressure compensation system so that a maximum amount of ultrasonic energy is released into the effluent. The transducer assemblies are installed around the periphery of each segment creating a uniform ultrasonic environment which helps to increase the mass transfer efficiency of the ozone. In addition, the 16 KHz and 20 KHZ ultrasonic generators are installed opposite to each other inside the tank to create a dual frequency field that continuously cleans the internal segment surface. The acoustic cavitations generated by the ultrasonic generators also greatly enhance the oxidation rate of the organic material with ozone bubbles and ensure uniform mixing of the oxidant with the effluent. Each transducer assembly includes a mounting flange that is sized to mate with a flange on the cylindrical segment. The flanges include a plurality of holes and suitable fasteners are passed through these holes to securely mount and effectively seal the transducer assemblies to the cylindrical segment. Each transducer assembly 32 includes a transducer and a 1000 W annular heating element enclosed within a housing that includes an annular mounting flange. The transducer assemblies are powered by electrical lines 30A through 30H as illustrated in FIG. 1.

The water exiting segment 5 is split into two flow paths 36A and 36B. Contained with each flow passageway 36A and 36B are hydrodynamic cavitation mixing manifolds 38A and 38B. Hydrodynamic cavitation mixers 38A and 38B are consist of a series of fixed baffles arranged so as to result in hydrodynamic cavitaiton much in the same way as created in hydrodynamic cavitaiton mixing chambers 48A through 48F, previously described. Also contained within the flow passageways 36A and 36B are a plurality of disc anodes 40 which help to produce hydroxyl radicals. Fluid passageways 36A and 36B terminate in outlets 42A and 42B which are positioned directly above inlets 6.

Figure 3A:
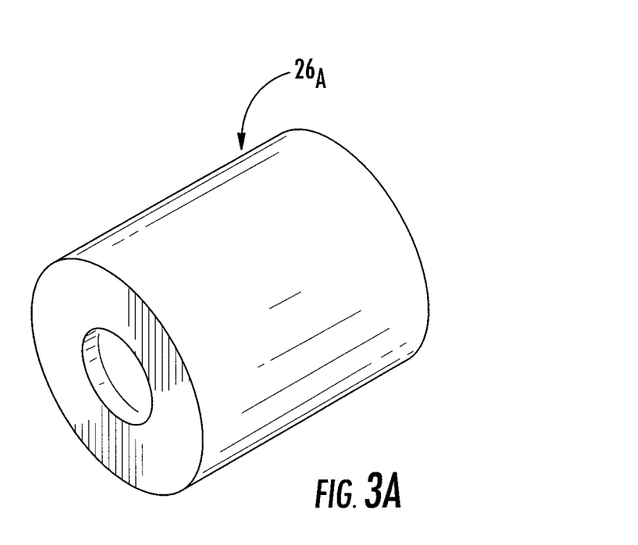
FIG. 3A is a perspective view of the flash reactor.
Figure 3B:
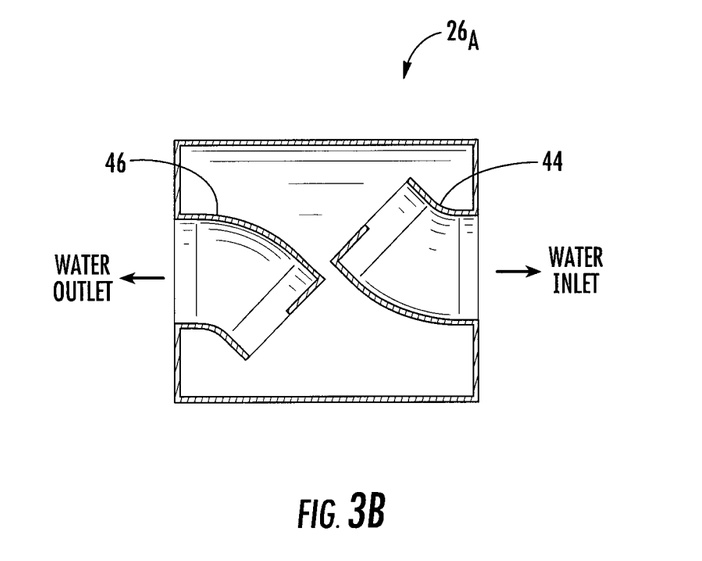
FIG. 3B is a sectional side view of the flash reactor.

FIG. 3A is a perspective view of one of the two flash reactors that are arranged in series 26A which is identical to flash reactors 26B through 26F. FIG. 3B is a cross sectional view of flash rector 26A. Flash reactor includes an inlet pipe 44 and an outlet pipe 46. Inlet pipe 44 is enters the reactor and is then turned forty-five degrees in one direction of the chamber within the reactor. The outlet pipe 46 is oriented at a forty-five degree in a direction opposite to the inlet pipe which ensures good mixing of the ozone with the water thereby increasing the mass transfer efficiency.

FIG. 4 is an end view of the treatment apparatus 2. The apparatus as shown includes two inlet ports 6. Inlet port 6 on the right hand side communicates with pump 17A whose output is directed via conduit 8 into ozone injector 24A. The output of ozone injector 24A is directed to flash reactor 26A and then into hydrodynamic cavitation mixing manifold 48A. An inlet passageway 50A conducts the fluid from manifold 48A to an inlet that introduces the fluid tangentially into the treatment segment 4A. The tangential entry of inlet induces a rotating flow into the cylindrical treatment segment thereby increasing the mixing of the ozone within the fluid. The inlet 6 on the left hand side of the treatment apparatus 2 communicates with pump 7a whose output is direct via conduit 9 into ozone injector 25A. The output of ozone injector 25A is directed to flash reactor 29A and then into hydrodynamic cavitation mixing manifold 48A. An inlet passageway 51A conducts the fluid from manifold 48A to an inlet that introduces the fluid tangentially into the cylindrical treatment segment 4A. Cylindrical treatment segments 4B through 4F have fluid flow paths on both the right and left hand side in the same manner as shown with respect to segment 4A.

Figure 5:
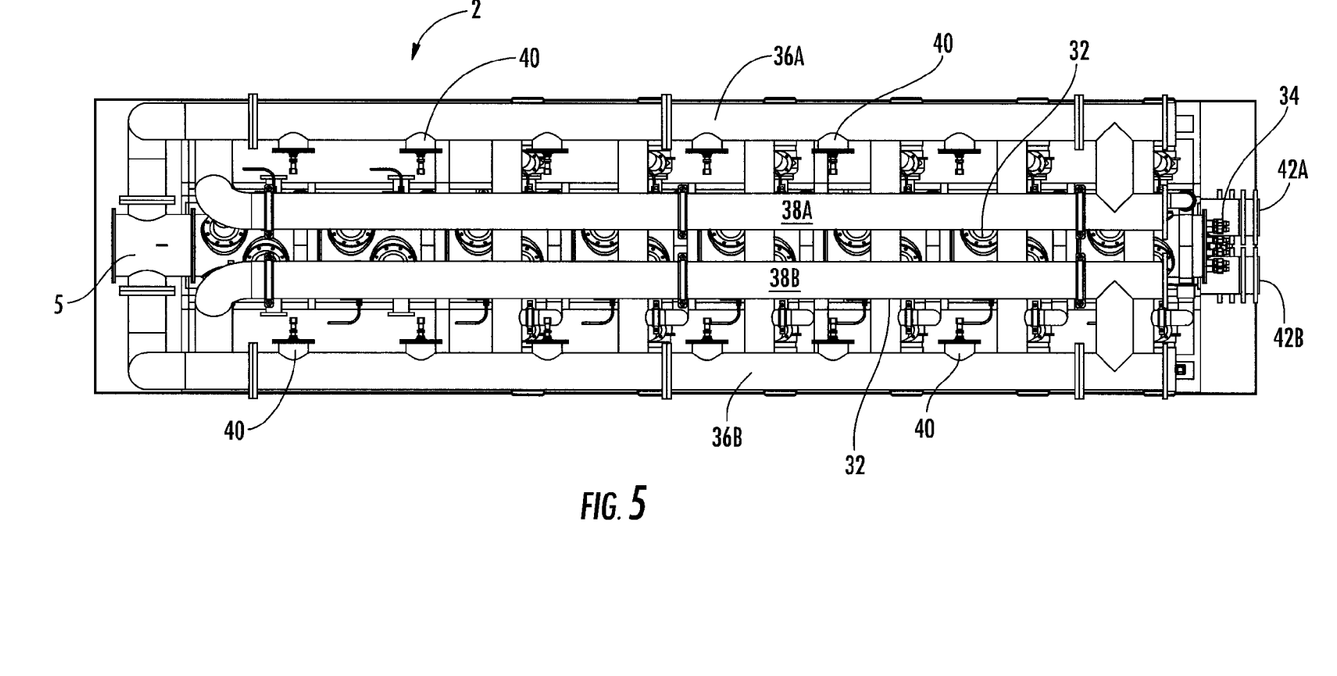
FIG. 5 is a top view of the treatment apparatus.

FIG. 5 is a top view of the fluid treatment apparatus 2. In this view it is possible to view the serpentine path of the outlet lines 36A and 36B. Outlet lines 36A and 36B are fluidly connected to cylindrical segment 5 located at one end of the treatment apparatus. Both lines then rise vertically and extend towards the opposite end of the treatment apparatus. As shown a plurality of disc anodes 40 are positioned within the outlet lines 36A and 36B. At this point each of the outlet lines 36A and 36B then double back towards the end of the treatment apparatus 2 where cylindrical segment 5 is located. This section of conduit generally indicated as 38A and 38B is a hydrodynamic cavitation mixing manifold. At this point outlet line 36A and 36B extend in a generally downward direction and then continue once again to the opposite end of the apparatus terminating in outlets 42A and 42B.

Figures 6A, 6B:
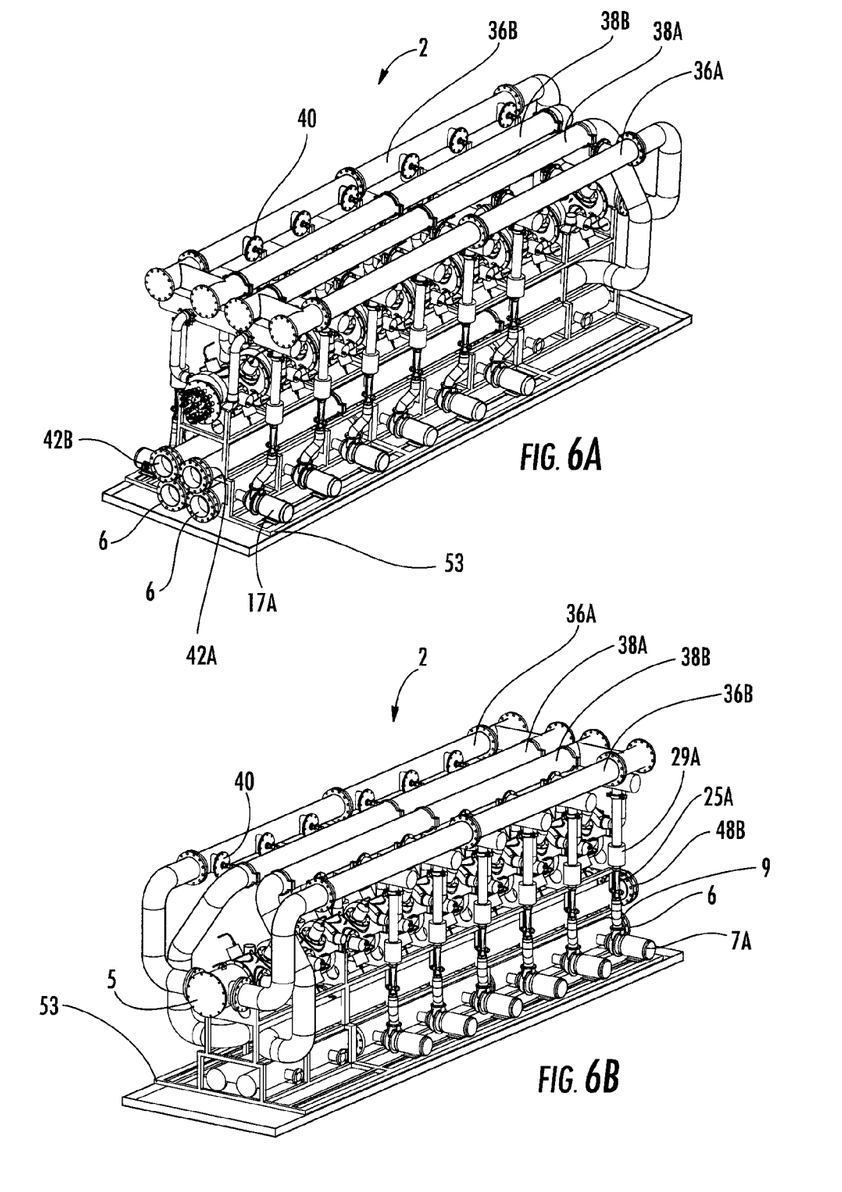
FIG. 6A is a perspective view of the treatment apparatus taken from one end.
FIG. 6B is a perspective view of the treatment apparatus taken from the opposite end as shown in FIG. 6A.

FIG. 6A is a perspective view of the treatment apparatus taken from one end. FIG. 6B is a perspective view of the treatment apparatus taken from the opposite end as shown in FIG. 6A. FIG. 6A shows the end of the treatment apparatus 2 with the inlets 6 and outlets 42A and 42B. Also shown are outlet lines 36A and 36B. The outboard sections of 36A and 36B each containing a plurality of disc anodes 40 and the inboard sections 38A and 38B configured as hydrodynamic mixing manifolds. The treatment apparatus 2 is mounted on a skid 53 to facilitate installation, maintenance and transportation.

FIG. 6B shows the opposite end of the treatment apparatus 2 which show the serpentine orientation of the fluid outlet lines 36A and 36B as they exit cylindrical segment 5 and travel back and forth three times from one end of the treatment apparatus to other. This view also illustrates the fluid and ozone inlet flow paths and equipment for cylindrical segments 4A through 4F that are of similar construction as the right side of the apparatus 2 as illustrated and described in FIG. 2.

Figure 7:
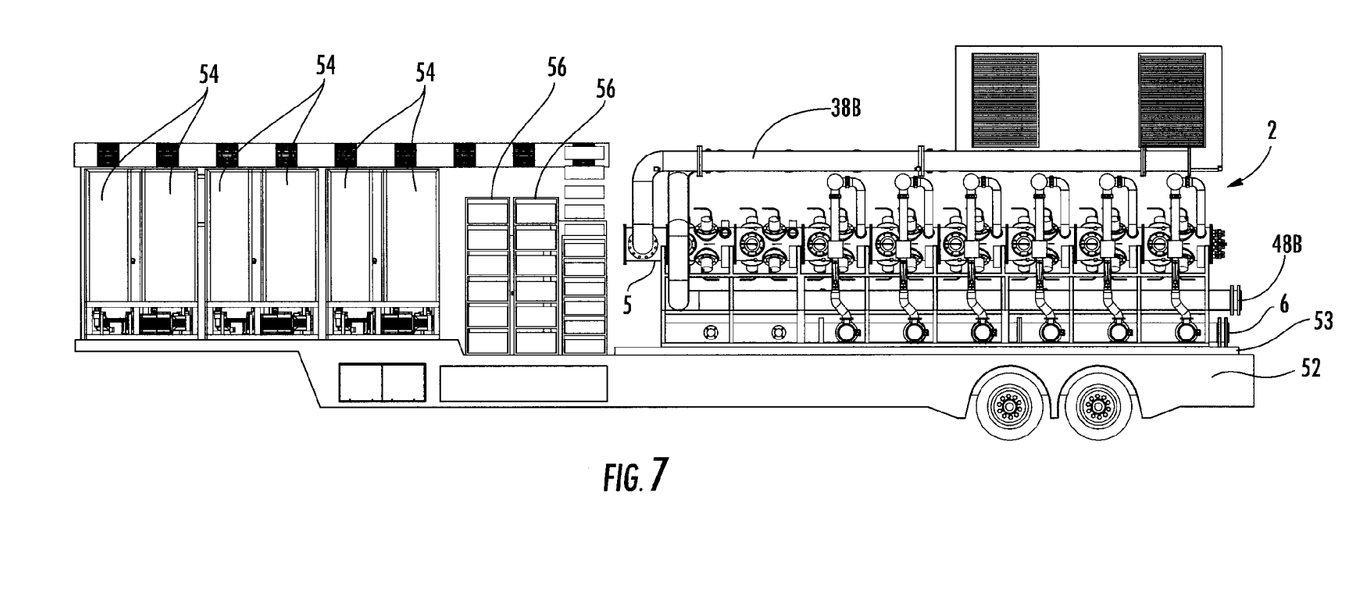
FIG. 7 is a side view of the treatment apparatus and associated equipment mounted on a truck trailer body.
Figure 8:
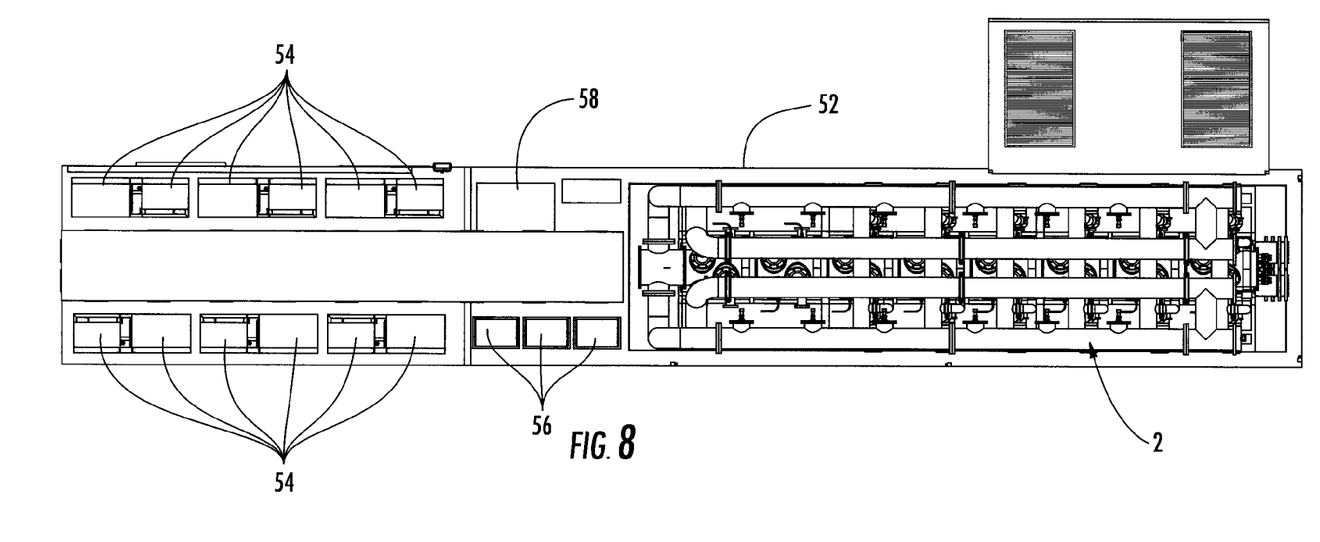
FIG. 8 is a top view of the treatment apparatus and associated equipment mounted on a truck trailer body.

FIG. 7 is a side view of the treatment apparatus and associated equipment mounted on a truck trailer body 52. By configuring the treatment apparatus 2 in a modular fashion and placing it on a skid that is removable from the truck trailer the system components can be readily replaced. The ability to swap out system component modules substantially minimizes system down time and improves the ability to repair the processing equipment in a quick and efficient manner. As can be seen the inlets 6 and outlets 48A and 48B are located at the rear end of the truck trailer 52. Ozone generators 54 are located at the forward end of the truck trailer 52 and the ultrasonic generators 56 are mounted between the ozone generators 54 and the treatment apparatus 2. FIG. 8 is a top view of the treatment apparatus 2 and associated equipment mounted on the truck trailer 52. This view shows the DC power supply 58 in addition to the ozone generators 54 and ultrasonic generators 56 shown in FIG. 7.

Figure 9:
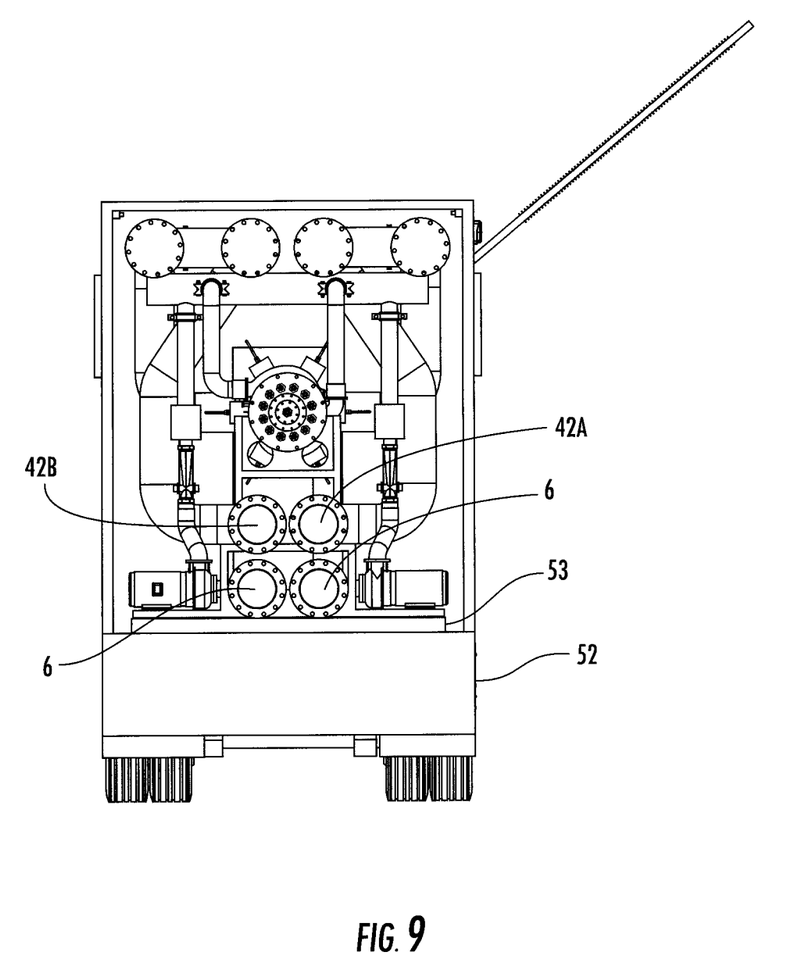
FIG. 9 is an end view of the treatment apparatus and associated equipment mounted on a truck trailer body.

FIG. 9 is a rear view of the truck trailer 52 with the treatment apparatus 2 supported on skid 53 mounted therein. Inlets 6 and outlets 42A and 42B are easily accessible from the rear of the trailer.

The theory of operation behind the main treatment is as follows. The mass transfer of ozone in the water is achieved by hydrodynamic and acoustic cavitations. In the pressurized treatment segments, 4A through 4F, water that has been ozonated is introduced into through two separate tangential inlet ports. Initially the water to be treated is pressurized by a pump which in turn feeds an ozone injector. The ozonated fluid is then introduced into a series of flash reactors which is used to reduce the size of the ozone bubbles to enhance the gas mass transfer efficiency. The ozonated fluid is then introduced into a hydrodynamic mixing manifold using inlets on both sides of the treatment apparatus. The hydrodynamic mixing manifold has two outlets each feeding a tangential inlet of the same cylindrical treatment. The phenomenon of hydrodynamic cavitations is created as the pressurized water leaves the small orifices within the hydro dynamic mixing manifold. The dissolved ozone forms into millions of micro bubbles which are mixed and reacted with the incoming water. As the water flows through the treatment apparatus the ultrasonic transducers located around the periphery of treatment apparatus at each segment emit 16 KHz and 20 KHz waves into the flow of water.

A sonoluminescence effect is observed due to acoustic cavitation as these ultrasonic waves propagate in the flow back water and catch the micro bubbles in the valley of the wave. Sonoluminescence occurs whenever a sound wave of sufficient intensity induces a gaseous cavity within a liquid to quickly collapse. This cavity may take the form of a pre-existing bubble, or may be generated through hydrodynamic and acoustic cavitation. Sonoluminescence can be made to be stable, so that a single bubble will expand and collapse over and over again in a periodic fashion, emitting a burst of light each time it collapses. A standing acoustic wave is set up within a liquid by four acoustic transducers and the bubble will sit at a pressure anti node of the standing wave. The frequencies of resonance depend on the shape and size of the container in which the bubble is contained. The light flashes from the bubbles are extremely short, between 35 and few hundred picoseconds long, with peak intensities of the order of 1-10 mW. The bubbles are very small when they emit light, about 1 micrometer in diameter depending on the ambient fluid, such as water, and the gas content of the bubble. Single bubble sonoluminescence pulses can have very stable periods and positions. In fact, the frequency of light flashes can be more stable than the rated frequency stability of the oscillator making the sound waves driving them. However, the stability analysis of the bubble shows that the bubble itself undergoes significant geometric instabilities, due to, for example, the Bjerknes forces and the Rayleigh-Taylor instabilities. The wavelength of emitted light is very short; the spectrum can reach into the ultraviolet. Light of shorter wavelength has higher energy, and the measured spectrum of emitted light seems to indicate a temperature in the bubble of at least 20,000 Kelvin, up to a possible temperature in excess of one mega Kelvin. The veracity of these estimates is hindered by the fact that water, for example, absorbs nearly all wavelengths below 200 nm. This has led to differing estimates on the temperature in the bubble, since they are extrapolated from the emission spectra taken during collapse, or estimated using a modified Rayleigh-Plesset equation. During bubble collapse, the inertia of the surrounding water causes high speed and high pressure, reaching around 10,000 K in the interior of the bubble, causing ionization of a small fraction of the noble gas present. The amount ionized is small enough fir the bubble to remain transparent, allowing volume emission; surface emission would produce more intense light of longer duration, dependent on wavelength, contradicting experimental results. Electrons from ionized atoms interact mainly with neutral atoms causing thermal bremsstrahlung radiation. As the ultrasonic waves hit a low energy trough, the pressure drops, allowing electrons to recombine with atoms, and light emission to cease due to this lack of free electrons. This makes for a 160 picosecond light pulse for argon, as even a small drop in temperature causes a large drop in ionization, due to the large ionization energy relative to the photon energy.

It is to be understood that while certain forms of the invention is illustrated, it is not to be limited to the specific form or process herein described and shown. It will be apparent to those skilled in the art that various changes may be made without departing from the scope of the invention and the invention is not to be considered limited to what is shown and described in the specification and drawings.

What is claimed is:

1. A process for lowering scaling tendencies in flowback water including the steps of:
pressurizing a source of flowback water;
injecting ozone into said flowback water;
passing said flowback water with injected ozone through a hydrodynamic mixing manifold to create hydrodynamic cavitation and then into a treatment apparatus;
directing said ozonated flowback water into at least one inlet passageway of said treatment apparatus;
energizing a plurality of ultrasonic transducers within said treatment apparatus to generate acoustic cavitation within said ozonated flowback water;
energizing a plurality of anodes and cathodes within said treatment apparatus to create an electrical potential within said treatment apparatus;
conveying the flowback water exiting the treatment apparatus through an outlet segment to at least one outlet line.

2. A process for lowering scaling tendencies in flowback water as set forth in claim 1 further including the steps of:
energizing a plurality of anodes within said outlet line thereby creating an electrical potential within said at least one outlet line.

3. A process for lowering scaling tendencies in flowback water as set forth in claim 1 further including the steps of:
creating hydrodynamic cavitation within at least a portion of said at least one outlet line.

4. A process for lowering scaling tendencies in flowback water as set forth in claim 1 further including the steps of:
directing said ozonated water into a plurality of inlet passageways of said treatment apparatus.

5. A process for lowering scaling tendencies in flowback water as set forth in claim 1 wherein said at least one inlet passageway introduces said ozonated flowback water tangentially into a segment of said treatment apparatus thereby inducing a rotational flow of flowback water within the treatment apparatus.

6. A process for lowering scaling tendencies in flowback water as set forth in claim 1 wherein said treatment apparatus includes a plurality of segments, said segments including a pair of inlet passageways, each of said inlets passageways introducing said ozonated flowback water tangentially into the segments.

7. A process for lower scaling tendencies in flowback water as set forth in claim 1, further including the step of electrically heating a plate adjacent each of one of said plurality of ultrasonic transducers.

8. A process for lower scaling tendencies in flowback water as set forth in claim 1, further including the step of mounting said plurality of anodes within said treatment apparatus with one end of each of said plurality of anodes at one end of said treatment apparatus and the opposite end of each one of said plurality of anodes at the opposite end of said treatment apparatus.

9. A process for lower scaling tendencies in flowback water as set forth in claim 1, further including the step of passing said ozonated water through a series of flash reactors prior to passing the ozonated water into said hydrodynamic mixing manifold.

10. A process for lower scaling tendencies in flowback water as set forth in claim 1, further including the step of sending oxygen through an ozone generator, said oxygen being concentrated from the air using an oxygen generator.

11. A process for lower scaling tendencies in flowback water as set forth in claim 10, further including the step of injecting said ozone through a port formed in a nozzle of the flowback water flow path.

12. A process for lower scaling tendencies in flowback water as set forth in claim 1, further including the step of mounting said treatment apparatus on a skid to facilitate installation, maintenance, repair, replacement and transport of said treatment apparatus.

13. A process for lower scaling tendencies in flowback water as set forth in claim 12, further including the step of mounting said skid in mounted on a truck trailer.

14. A process for lower scaling tendencies in flowback water as set forth in claim 13, further including the step of mounting an ozone generator on said truck trailer.

15. A process for lower scaling tendencies in flowback water as set forth in claim 13, further including the step of mounting an ultrasonic generator on said truck trailer.

16. A process for lower scaling tendencies in flowback water as set forth in claim 13, further including the step of mounting a DC power supply source on said truck trailer.

17. A process for lowering scaling tendencies in flowback water as set forth in claim 1 including the step of creating a pressure greater than atmospheric pressure within said treatment apparatus.

18. A process for lowering scaling tendencies in flowback water as set forth in claim 1 including the step of electro chemically treating the flowback water in said at least one outlet line.

19. A process for lowering scaling tendencies in flowback water as set forth in claim 1 including the step of exposing the flowback water in said at least one outlet line to hydrodynamic cavitation.

* * * * *